2,974,006

DIRECT CONVERSION OF URANIUM TURNINGS TO URANIUM TETRAFLUORIDE

Otto E. Fry, Baton Rouge, La., assignor to the United States of America as represented by the United States Atomic Energy Commission No Drawing. Filed Oct. 6, 1953, Ser. No. 384,532

2 Claims. (Cl. 23—14.5)

The present invention relates to a method for recovering scrap uranium metal, and more particularly to a method of converting waste uranium metal turnings directly to uranium tetrafluoride.

Because of the value of uranium metal, it is desirable to recover for subsequent reuse the waste metal resulting from various machining processes. However, any process for recovering such uranium metal must necessarily produce a high yield and must be capable of such production in a relatively short time with a minimum of steps in order that such recovery be economically feasible.

One general process for recovery of waste uranium metal involves the conversion of the waste metal to uranium tetrafluoride, which in turn is converted to the pure metal. The purified metal has a number of known uses such as, for example, the production and storage of pure hydrogen isotopes, in nuclear reactors, in preparation of compounds for the production of fluorescent glass, paint pigments, photographic materials and the like.

The present invention is particularly related to a simplification of the first of these conversions, i.e., the production of uranium tetrafluoride.

Heretofore, scrap uranium metal recovery processes generally involved one of two procedures. The first of these procedures includes the following reactions.

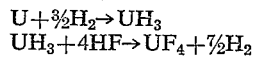

Massive pieces of uranium metal are first converted into the hydride at 250° C. This hydride is then converted to uranium tetrafluoride through the reaction with hydrogen fluoride. However, in this second reaction thorough agitation is required in order to obtain a complete conversion to the tetrafluoride. If agitation is not used in this process, the reaction of the hydrogen fluoride with uranium hydride is incomplete due to caking. If the hydride is decomposed at 500° C., and the resulting finely powdered metal is treated with hydrogen fluoride at the same temperature, the hydride is converted to uranium tetrafluoride without the necessity of agitation.

A second procedure of the prior art, similar to the first, combines the two reactions by simultaneously reacting hydrogen and hydrogen fluoride with the uranium metal. However, massive pieces of uranium larger than 50 grams cannot be treated in this simplified way, since the reaction taking place at the surface of the large pieces of metal liberates heat sufficient to inhibit the formation of the hydride. In order to prevent this slowing of the hydride formation cooling is required. See "The Chemistry of Uranium," Katz and Rabinowitch, volume VIII–5, page 364, McGraw-Hill (1951).

In both of these procedures which are also applicable to masses of uranium metal turnings, the uranium hydride must be formed before the uranium tetrafluoride will result.

The present invention is directed to obtaining uranium tetrafluoride without the necessity of first, or simultaneously, reacting the uranium metal with hydrogen in order to form uranium hydride.

The object of the present invention is to reduce the number of chemical reactions required in order to recover scrap uranium turnings, with a resulting saving in time, expense, and materials (hydrogen).

A further object is to provide a process for converting large quantities of uranium metal turnings into uranium tetrafluoride which is fast, economical, and which produces very high recovery yields.

A still further object is to provide a process for converting large quantities of uranium metal turnings into uranium tetrafluoride which does not require agitation of the metal in order to sustain the reaction of the hydrogen fluoride with the uranium metal turnings.

A still further object is to provide a process for converting large quantities of uranium metal turnings into massive uranium tetrafluoride which may be easily and safely handled without the danger of uranium tetrafluoride dust.

In the present process uranium metal turnings resulting from various uranium machining operations, and which are contaminated with water soluble machining oils are first placed in a cleaning bath. This bath may consist of any one of the known uranium metal cleaners such as acetone, carbon tetrachloride or a cold nitric acid solution. The cleaned turnings are then placed in a reaction chamber. The chamber is flushed with an inert gas such as argon or helium for a short period of time to remove the air. The chamber is then brought to a temperature of between 400° C. to 600° C., and commercial anhydrous hydrogen fluoride in gaseous form is passed in a stream through the chamber for from two to four hours. After such time has elapsed, the temperature is raised an additional 200° C. and maintained at this level for at least one-half hour, while anhydrous hydrogen fluoride is continued to be passed through the chamber. This increased temperature treatment converts the uranium tetrafluoride into a massive stage wherein the danger from uranium tetrafluoride dust is reduced. The reaction of the uranium metal with the anhydrous hydrogen fluoride is completed at this stage forming massive uranium tetrafluoride; neither hydrogen nor agitation being required to initiate or sustain the reaction.

The preferred process for directly converting contaminated uranium metal turnings to uranium tetrafluoride is as follows:

First, 100 grams of uranium metal turnings are cleaned by treatment with nitric acid (1:1 ratio). The turnings are then placed in a platinum rhodium boat and placed in a nickel reaction chamber.

Second, the chamber is flushed with helium for ten minutes to prevent oxidation and is then brought to a temperature of 500° C. Anhydrous hydrogen fluoride, free of hydrogen gases, is passed through the chamber at the rate of 200 grams per hour for three and one-half hours. The temperature is then raised to 700° C. and maintained at that level for one hour while the anhydrous hydrogen fluoride continues to be passed into the reaction chamber at the same rate. Next the uranium tetrafluoride formed is cooled to room temperature, weighed and calculated for conversion of uranium to uranium tetrafluoride. A conversion of about 99.5 percent is obtained of uranium tetrafluoride sufficiently pure for use in a process of reducing to pure uranium metal. See "The Chemistry of Uranium," Katz and Rabinowitch, volume VIII–5, pages 127–128, McGraw-Hill (1951), for examples of processes for the reduction of uranium tetrafluoride to pure uranium metal.

Thus, the present process provides a fast, economical, and simple method of obtaining uranium tetrafluoride, a product which is, in general, a stable rather inert substance, and, therefore, may be handled and stored without the necessity of taking elaborate precautions against oxidation and the like.

What is claimed is:

1. The method of converting uranium metal turnings directly into uranium tetrafluoride which consists of cleaning uranium metal turnings, treating the cleaned turnings with a stream of anhydrous, hydrogen-free, hydrogen fluoride for from two to four hours at a temperature of between 400° C. and 600° C., raising the temperature by at least 200° C. while continuing the hydrogen fluoride treatment, and maintaining the increased temperature treatment for at least one-half hour.

2. The method of converting uranium metal turnings directly into uranium tetrafluoride which consists of cleaning uranium metal turnings, heating the cleaned turnings to 500° C. in an inert atmosphere, passing anhydrous, hydrogen-free, hydrogen fluoride over the turnings while maintaining the temperature at 500° C., raising the temperature to 700° C. while continuing to pass anhydrous hydrogen fluoride over the turnings for one hour.

References Cited in the file of this patent

Mellor: Comprehensive Treatise on Inorganic and Theoretical Chemistry, vol. 12, page 31 (1932), published by Longmans, Green and Co., London. (Copy in Scientific Library.)

Katz and Rabinowitch: The Chemistry of Uranium, vol. VIII–5, McGraw-Hill (1951), page 167.